US006383271B1

(12) United States Patent
Schmidt

(10) Patent No.: US 6,383,271 B1
(45) Date of Patent: May 7, 2002

(54) ANTI-CORROSIVE COATING INCLUDING A FILLER WITH A HOLLOW CELLULAR STRUCTURE

(75) Inventor: Christina Schmidt, Althengstett (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/491,746

(22) Filed: Jan. 27, 2000

(30) Foreign Application Priority Data

Jan. 29, 1999 (DE) .......................................... 199 03 400

(51) Int. Cl.[7] ................................................. C23F 11/00
(52) U.S. Cl. ................................ 106/14.41; 106/14.05; 106/14.41; 106/14.42; 252/387; 252/388
(58) Field of Search ........................... 106/14.05, 14.41, 106/14.42, 14.44; 252/387, 388; 524/424, 448, 450

(56) References Cited

U.S. PATENT DOCUMENTS

| 3,899,624 A | 8/1975 | Sutherland ................... 428/327 |
| 4,972,000 A | * 11/1990 | Kawashima et al. .......... 521/54 |

FOREIGN PATENT DOCUMENTS

| DE | 1049518 | 1/1962 |
| DE | 3001882 | 8/1980 |
| DE | 19700319 | 7/1997 |
| JP | 62-55334 | * 3/1987 |

OTHER PUBLICATIONS

Derwent Patent Abtract No. 1983–005075, abstract of Soviet Union Patent Specification No. 974027 (Nov. 1982).*
Derwent Patent Abstract No. 1994–005075, abstract of Soviet Union Patent Specification No. 1781084 (Dec. 1982).*

* cited by examiner

Primary Examiner—Anthony Green
(74) Attorney, Agent, or Firm—W. F. Fasse; W. G. Fasse

(57) ABSTRACT

An anti-corrosive coating composition suitable for providing corrosion protection for a sheet metal substrate includes from 20 to 97 wt. % of a filler dispersed in a polymeric base or matrix material. The filler includes at least one filler material having a hollow cellular structure, of which the hollow cells are loaded with organic and/or inorganic inhibitors and/or antioxidants. The hollow cellular structure material may be diatomaceous earth, zeolite, or carbon. The inhibitors and/or antioxidants may be selected from carbonic acids, amines, ketones, aldehydes, heterocyclic compounds, phosphates, benzoates, silicates, vanadates, tungstates, zirconates, borates, molybdates, benzaldehyde, vitamin C, vitamin E, or the like. A long term durable corrosion protection is achieved because the inhibitors and/or antioxidants are released from the hollow cells of the filler material in a dosed time-release manner over the operating lifetime of the anti-corrosive coating.

23 Claims, No Drawings

ANTI-CORROSIVE COATING INCLUDING A FILLER WITH A HOLLOW CELLULAR STRUCTURE

PRIORITY CLAIM

This application is based on and claims the priority under 35 U.S.C. §119 of German Patent Application 199 03 400.1, filed on Jan. 29, 1999, the entire disclosure of which is incorporated herein by reference.

FIELD OF THE INVENTION

The invention relates to an anti-corrosive coating that is based on an organic polymer coating matrix material with filler materials dispersed therein, and that is suitable for coating and protecting a metal substrate against corrosion.

BACKGROUND INFORMATION

In the present state of the art, high demands are placed on the coating of metallic substrate surfaces with regard to the corrosion protection that is to be provided by such coatings. This is especially true with regard to the long term durability of the corrosion protection effect that is provided by such coatings, especially when they are subjected to strongly varying environmental conditions, for example as typically arise in connection with vehicles of all types. Namely, during the operating lifetime of conventional vehicles, such as automobiles and trucks for example, the various metal components and especially the sheet metal body panels of such vehicles are subjected to various harsh environmental influences, such as water, salt, chemicals, alternating hot and cold temperatures, and the like, which tend to accelerate the corrosion of the metal material.

It is generally known to galvanize or zinc electroplate sheet metal panels, and then to coat the galvanized sheet metal panels with an organic coating material, for example as disclosed in German Patent Laying-Open Document 197 00 319. However, it has been found in practice that galvanized sheet metal that has been provided with phosphate and/or chromate layers as well as paint, lacquer or polymeric coating layers, does not achieve an adequate durable and complete corrosion protection, especially when subjected to the varying operating conditions and environmental influences that are typical in an application to motor vehicles.

Galvanized sheet metal in some circumstances may even be categorized as antagonistic or hostile to an anti-corrosive coating, if a zinc-powder-loaded paint or coarsely ground zinc particles are used for the coating material. Namely, such galvanized sheet metal does not have a reliable cathodic corrosion protection effect, because such zinc particles have a tendency to oxidize rather quickly and thereby become electric insulators. As a result, the electrical conductivity of the anti-corrosive or corrosion protection coating is reduced to such an extent that the cathodic protective effect is significantly diminished or completely eliminated. Since such a cathodic protective effect is especially important in the context of preventing a so-called under-rusting or progressive rusting of the metal substrate under the coating, the reduction or elimination of this cathodic protective effect leaves the metal substrate material very vulnerable to corrosive attack.

The above problems also apply to non-galvanized or non-plated sheet metal materials that have been coated with organically based coating materials loaded with fillers in an effort to improve the corrosion resistance. Such fillers conventionally comprise electrically conducting metal particles that have a negative electrical potential relative to the potential of the sheet metal substrate itself. For example, zinc, aluminum or magnesium particles could be used as such fillers in connection with a steel sheet material. Also in this case, the metal particles used as the filler have a tendency to readily oxidize and thereby significantly reduce or deteriorate the cathodic protective effect.

The above described reduction of the cathodic protection due to the oxidation of the galvanized layer or the added metal particles in organic protective coatings leads to a relatively rapid reduction of the initial corrosion protective effect after an extended operating time in the ambient air and particularly in damp or humid atmospheres.

SUMMARY OF THE INVENTION

In view of the above it is an object of the invention to provide an anti-corrosive or corrosion protection coating for sheet metal substrates that has long-term durable corrosion inhibiting characteristics, and especially a time-release dosing of a corrosion protection effect over the operating lifetime of the coating. The invention is directed to the coating composition both in a state before it has been applied onto a substrate (for example a liquid sprayable or spreadable state), and in a state in which it forms a solid coating layer after it has been applied onto a substrate. The invention further aims to avoid or overcome the disadvantages of the prior art, and to achieve additional advantages, as are apparent from the present specification.

The above objects have been achieved according to the invention in an anti-corrosive coating composition suitable for coating metal substrate surfaces. The coating composition comprises a base material or matrix of a polymer or the like, and a proportion of about 20 to 97 wt. % of a filler, wherein the filler at least partially consists of a material having a hollow cellular structure, of which the hollow cells are loaded with at least one additive comprising organic and/or inorganic inhibitors and/or antioxidants. Generally any suitable known organic polymeric base material or matrix material can be used for the coating.

The filler material having a hollow cellular structure that is added or mixed into the polymeric base or matrix material may, for example, comprise zeolites or diatomaceous earth (also known as kieselguhr) or porous carbon. The pores or hollow cells of the filler material are at least partially filled or saturated with the inorganic and/or organic inhibitors and/or antioxidants, such as amines, ascorbic acids, zirconates, or benzotriazol, for example.

An advantage of the inventive coating composition is as follows. During the operating lifetime of the sheet metal substrate material, the environmental influences acting thereon cause a progressive permeation of oxygen and water into and through the polymer based coating. Responsively to this permeation of oxygen and water into the polymer based coating, the inhibitors and/or antioxidants that have been loaded into the hollow cellular structures of the filler are progressively dissolved or leached out of the hollow cellular structures in a dosed manner over a long time span. The inhibitors or antioxidants diffuse through the polymer based coating to the surface of the sheet metal, where they act as surface active substances to provide a corrosion protective effect for the sheet metal substrate. Furthermore, the inhibitors and/or antioxidants loaded into the hollow cellular structures have an advantageous intercepting and scavenging effect for the oxygen that diffuses into the polymeric based coating. Thereby the oxidation of the substrate surface is reduced and the long term durability and effectiveness of the corrosion protection is improved.

DETAILED DESCRIPTION OF PREFERRED EXAMPLE EMBODIMENTS AND OF THE BEST MODE OF THE INVENTION

The inventive corrosion protection coating comprises a base or matrix of any suitable polymeric coating material, making up about 3 to 80 wt. % of the overall coating composition. The coating further includes 20 to 97 wt. % of a filler that comprises hollow cellular structures such as porous or hollow cellular particles. The filler material may comprise various different porous or hollow cellular structure particle materials, such as diatomaceous earth (also known as kieselguhr, which is predominantly $SiO_2$), zeolites, or porous carbon particles. Additionally, the filler may include one or more other filler materials (e.g. any conventional coating filler) that do not have a hollow cellular structure.

If the filler makes up less than 20 wt. % of the overall composition, then the anti-corrosive effects according to the invention will not be adequately achieved. On the other hand, if the filler makes up more than 97 wt. % of the overall composition, then the polymer based matrix material will not be able to form a continuous matrix and the permeation of oxygen and water through the coating would be disadvantageously accelerated. The particular proportion of the filler material is selected for each particular application, so that the resulting coating will provide an adequate corrosion protective effect for the underlying sheet metal substrate due to the above mentioned oxygen scavenging and other effects. This is especially to be achieved without the filler containing any zinc or iron phosphide. In other words, the present anti-corrosive composition preferably totally excludes any zinc or iron phosphide.

The pores or hollow cells of the filler are preferably substantially saturated with inhibitors and antioxidants, which may be selected depending on the particular end use application of the coating material. It is also possible to select only a single inhibitor or a single antioxidant, or a combination of inhibitors, or a combination of antioxidants. Suitable inhibitors include carbonic acids, amines, ketones, aldehydes, and heterocyclic compounds. It is also possible to use or to further add phosphates, benzoates, silicates, vanadates, tungstates, zirconates, borates, or molybdates, or similar substances. On the other hand, suitable antioxidants include benzaldeyhde, vitamin C (ascorbic acid), vitamin E (tocopherols), and similar known antioxidant substances, which develop a surface active effect once they have reacted with atmospheric oxygen.

The particle or grain size of the filler particles to be used in the inventive coating composition is selected depending on the desired coating thickness of the anti-corrosive coating in the end use application. Suitable particle sizes are in a range from 0.5 $\mu$m to 10 $\mu$m. The particulate filler materials disclosed herein can readily be prepared in the required particle sizes by any conventionally known processes, such as wet or dry milling.

Various processes are also available for loading the inhibitors and/or antioxidants into the pores or hollow cells of the filler material, depending on the aggregate physical state of the inhibitor and/or antioxidant substances. In the case of solid inhibitors and antioxidants, these substances may be dissolved in a respective suitable solvent and then mixed with the dry particulate filler material at room temperature so that the inhibitor and antioxidant substances dissolved in the solvent soak into the pores or hollow cells of the filler material. The filler material may be used with the solvent still present in the pores, or the solvent may be allowed to evaporate at room temperature or at elevated temperature to leave behind the inhibitors and antioxidants in the pores of the filler material before the filler material is mixed with the polymeric base of the coating composition. A person of ordinary skill in the art will be able to select any suitable conventionally available solvent for dissolving the selected inhibitors and/or antioxidants.

In order to load liquid inhibitors and antioxidants into the filler material, the selected dry filler material may be filled into a column, into which the liquid inhibitors and/or antioxidants are then introduced. The liquid materials may be allowed to steep or soak into the pores of the filler material, or can be allowed to flow through the column. In this context, particularly, the loading of the inhibitors and antioxidants into the porous or hollow cellular filler material is carried out substantially according to the generally known principles of column chromatography. Thereby the particular percentage loading of the antioxidants and/or inhibitors into the filler material can be precisely controlled.

A further possibility is to transform solid or liquid antioxidants and/or inhibitors into the gas phase, whereupon the resulting gas is directed into a column that has been filled with the selected dry filler material. By flowing the gas through the column, the antioxidants and/or inhibitors are loaded into the filler material, generally according to the known principles of gas chromatography, whereby the loading fraction can also be precisely selected, determined, or controlled.

The following table shows several selected example compositions of an anti-corrosive coating according to the invention. In each of the example compositions, the base material of the coating is an organic polymer material having a generally conventional composition, the filler is diatomaceous earth, and the additive loaded into the filler is benzaldehyde. The weight percentages relate to the proportions of the diatomaceous earth and the benzaldehyde respectively, as percentages of the overall filler.

| Example | Filler: Diatomaceous Earth (wt. %) | Additive: Benzaldehyde (wt. %) |
| --- | --- | --- |
| 1 | 99.9 | 0.1 |
| 2 | 99.7 | 0.3 |
| 3 | 99.0 | 1 |
| 4 | 97.0 | 3 |
| 5 | 90 | 10 |

In the example compositions shown in the preceding table, the benzaldehyde is transformed into the gas phase in a vacuum and then transported by an inert carrier gas, such as nitrogen or argon, through a column filled with the diatomaceous earth, in a general process similar to gas chromatography. Once the filler material has been loaded with the selected antioxidant(s) and/or inhibitor(s), the loaded filler material must be stored in a manner to exclude atmospheric oxygen, until the loaded filler is mixed into the polymeric base material for preparing the anticorrosive coating composition. It is also possible to mix the inventive loaded filler material with any other conventional filler materials for use in the anti-corrosive coating composition.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An anti-corrosive coating composition comprising 3 to 80 weight percent of a polymeric matrix material and 20 to 97 weight percent of a filler, wherein said filler comprises particles of a first filler material having a hollow cellular structure with hollow cells therein and at least one additive selected from the group consisting of inhibitors and antioxidants loaded in said hollow cells, and wherein said particles of said first filler material are mixed and dispersed in said polymeric matrix material.

2. The anti-corrosive coating composition according to claim 1, wherein said filler entirely consists of said first filler material.

3. The anti-corrosive coating composition according to claim 1, wherein said filler further comprises a second filler material that does not have a hollow cellular structure.

4. The anti-corrosive coating composition according to claim 1, wherein said additive is an organic additive.

5. The anti-corrosive coating composition according to claim 1, wherein said additive is an inorganic additive.

6. The anti-corrosive coating composition according to claim 1, wherein said additive comprises at least one of said inhibitors, which are selected from the group consisting of phosphates, benzoates, silicates, vanadates, tungstates, zirconates, borates, and molybdates.

7. The anti-corrosive coating composition according to claim 1, wherein said additive comprises at least one of said inhibitors, which are selected from the group consisting of carbonic acids, amines, ketones, aldehydes, and heterocyclic compounds.

8. The anti-corrosive coating composition according to claim 1, wherein said additive comprises at least one of said antioxidants, which are selected from the group consisting of benzaldehydes, vitamin C and vitamin E.

9. The anti-corrosive coating composition according to claim 1, wherein said inhibitors and said antioxidants are selected from the group consisting of amines, ascorbic acid, zirconates, and benzotriazole.

10. The anti-corrosive coating composition according to claim 1, wherein said filler does not include zinc and does not include iron phosphide.

11. The anti-corrosive coating composition according to claim 1, wherein said polymeric matrix material comprises an organic polymer.

12. The anti-corrosive coating composition according to claim 1, wherein said particles of said first filler material have a particle size in a range from 0.5 $\mu$m to 10 $\mu$m.

13. The anti-corrosive coating composition according to claim 1, in the form of a coating layer having such a characteristic that atmospheric oxygen and water can diffuse into said coating layer and progressively cause leaching of said additive out of said hollow cells of said filler material and through said coating layer.

14. The anti-corrosive coating composition according to claim 1, in the form of a coating layer, in combination with a sheet metal substrate on which said coating layer is applied.

15. The anti-corrosive coating composition according to claim 1, wherein said coating composition is in a liquid sprayable or spreadable state.

16. An anti-corrosive coating composition comprising 3 to 80 weight percent of a polymeric matrix material and 20 to 97 weight percent of a filler, wherein said filler comprises a first filler material having a hollow cellular structure with hollow cells therein, a second filler material that does not have a hollow cellular structure, and at least one additive selected from the group consisting of inhibitors and antioxidants loaded in said hollow cells.

17. An anti-corrosive coating composition comprising 3 to 80 weight percent of a polymeric matrix material and 20 to 97 weight percent of a filler, wherein said filler comprises a first filler material having a hollow cellular structure with hollow cells therein and at least one additive selected from the group consisting of inhibitors and antioxidants loaded in said hollow cells, and wherein said first filler material having said hollow cellular structure comprises a material selected from the group consisting of diatomaceous earth, zeolite, and carbon.

18. The anti-corrosive coating composition according to claim 17, wherein said first filler material having said hollow cellular structure comprises said diatomaceous earth.

19. The anti-corrosive coating composition according to claim 17, wherein said first filler material having said hollow cellular structure comprises said zeolite.

20. The anti-corrosive coating composition according to claim 17, wherein said first filler material having said hollow cellular structure comprises said carbon.

21. The anti-corrosive coating composition according to claim 17, wherein said first filler material having said hollow cellular structure consists of said diatomaceous earth, and said additive consists of a benzaldehyde.

22. The anti-corrosive coating composition according to claim 21, wherein said filler consists of 90 to 99.9 weight percent of said diatomaceous earth and 0.1 to 10 weight percent of said benzaldehyde.

23. A method of making an anti-corrosive coating composition comprising 3 to 80 weight percent of a polymeric matrix material and 20 to 97 weight percent of a filler, wherein said filler comprises a first filler material having a hollow cellular structure with hollow cells therein and at least one additive selected from the group consisting of inhibitors and antioxidants loaded in said hollow cells, said method comprising:

a) providing said first filler material in solid form;

b) providing said additive in solid form, liquid form or gaseous form;

c) infiltrating said additive into said hollow cells of said first filler material; and d) mixing said polymeric matrix material and said first filler material which has been infiltrated with said additive;

wherein said infiltrating comprises dissolving and mixing said additive and said first filler material in a liquid solvent if said additive is in said solid form, permeating said additive into a bed of said first filler material in the manner of column chromatography if said additive is in said liquid form, or permeating said additive into a bed of said first filler material in the manner of gas chromatography if said additive is in said gaseous form.

* * * * *